(12) United States Patent
Mandeville et al.

(10) Patent No.: US 11,920,527 B2
(45) Date of Patent: Mar. 5, 2024

(54) MULTI-FUNCTION KEY-OPERATED IGNITION SWITCH FOR OUTDOOR POWER EQUIPMENT FOR SELECTING DIFFERENT OPERATING SPEEDS

(71) Applicant: HUSQVARNA AB, Huskvarna (SE)

(72) Inventors: Kenneth Mandeville, Midland, NC (US); Scott Johnson, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/011,353

(22) PCT Filed: Oct. 20, 2020

(86) PCT No.: PCT/US2020/056508
§ 371 (c)(1),
(2) Date: Dec. 19, 2022

(87) PCT Pub. No.: WO2022/066190
PCT Pub. Date: Mar. 31, 2022

(65) Prior Publication Data
US 2023/0228225 A1    Jul. 20, 2023

Related U.S. Application Data

(60) Provisional application No. 63/084,264, filed on Sep. 28, 2020.

(51) Int. Cl.
*F02D 31/00* (2006.01)
*F02N 11/08* (2006.01)
(Continued)

(52) U.S. Cl.
CPC ........ *F02D 31/001* (2013.01); *F02N 11/0803* (2013.01); *H01H 27/06* (2013.01); *E01H 5/08* (2013.01)

(58) Field of Classification Search
CPC ... F02D 31/001; F02N 11/0803; H01H 27/06; E01H 5/08
See application file for complete search history.

(56) References Cited

U.S. PATENT DOCUMENTS 10,107,207 B2 * 10/2018 Li ........................... F02D 11/02
2001/0048246 A1 * 12/2001 Shamoto ................. B60R 25/04
307/10.6
(Continued)

FOREIGN PATENT DOCUMENTS

CN    201714498 U    1/2011
CN    104775940 B    7/2015
(Continued)

OTHER PUBLICATIONS

International Search Report and Written Opinion for International Application No. PCT/US20/056508 dated Jun. 23, 2021.

(Continued)

*Primary Examiner* — Sizo B Vilakazi
(74) *Attorney, Agent, or Firm* — Burr & Forman LLP

(57) ABSTRACT

A powered device may include an engine, a mobility assembly operably coupled to the engine to provide mobility of the powered device responsive at least in part to operation of the engine, a working assembly operably coupled to the engine to perform a working function responsive at least in part to operation of the engine, and a key-operated combination ignition and speed control assembly including switch circuitry configured to control both starting the engine and selection of different selectable positions corresponding to respective different operating speeds for the engine.

20 Claims, 3 Drawing Sheets

(51) Int. Cl.
*H01H 27/06* (2006.01)
*E01H 5/08* (2006.01)

(56) References Cited

U.S. PATENT DOCUMENTS

| | | | | |
|---|---|---|---|---|
| 2008/0295552 | A1* | 12/2008 | Tsuchikiri | B60R 25/04 |
| | | | | 70/252 |
| 2015/0066309 | A1* | 3/2015 | Porter | B60W 10/02 |
| | | | | 701/48 |
| 2015/0233311 | A1* | 8/2015 | Repasky | F02D 33/006 |
| | | | | 123/332 |
| 2020/0277923 | A1* | 9/2020 | Dixon | F02D 41/064 |

FOREIGN PATENT DOCUMENTS

| | | | |
|---|---|---|---|
| CN | 105448572 | A | 3/2016 |
| CN | 205303276 | U | 6/2016 |
| CN | 205303279 | U | 6/2016 |
| EP | 2361104 | A | 10/2001 |
| EP | 1997697 | A2 | 12/2008 |
| EP | 3715167 | A1 | 9/2020 |
| WO | 2010051409 | A2 | 5/2010 |

OTHER PUBLICATIONS

EMSKR: What do these controls mean and how do I set them? Toro snowblower, Retreived From https://www.reddit.com, 9 Pages.
Sears Parts Direct, "How to Operate the Basic Controls on a Snowblower", Retreived From YouTube (https://www.youtube.com/watch?v=XHfJf8tS--U), Nov. 25, 2014, 2 Pages.

* cited by examiner

MULTI-FUNCTION KEY-OPERATED IGNITION SWITCH FOR OUTDOOR POWER EQUIPMENT FOR SELECTING DIFFERENT OPERATING SPEEDS

TECHNICAL FIELD

Example embodiments generally relate to outdoor power equipment and, more particularly, relate to power equipment that can be provided with a combination ignition and throttle switch.

BACKGROUND

Grounds care/yard maintenance and other outdoor tasks associated with grooming and maintaining property are commonly performed using various tools and/or machines that are configured for the performance of corresponding specific tasks. Certain tasks, like snow removal, are typically performed by snow removal equipment such as snow blowers or snow throwers. Meanwhile, mowing and other yard maintenance tasks may be performed by walk behind or riding lawn mowers.

The form factors for each of these various types of outdoor power equipment can vary widely. For example, starters, engines, control features, and accessories can all be different on different respective models. As an example, some of the machines that fall into these categories are started using a recoil starter, whereas others may have an electric starter, e.g., having a keyed ignition switch. For those that have an electric starter or keyed ignition switch, one common feature relates to the fact that the keyed ignition switch is provided separately from speed control. Thus, the keyed ignition switch will typically have three positions including an off position, a run position, and a start position that often spring returns to the run position. While the engine is running (and the keyed ignition switch is in the run position), speed control will typically be handled via a separate switch assembly or speed controller. This results in extra parts being needed, and additional points of potential failure.

BRIEF SUMMARY OF SOME EXAMPLES

In an example embodiment, a powered device may be provided. The powered device may include an engine, a mobility assembly operably coupled to the engine to provide mobility of the powered device responsive at least in part to operation of the engine, a working assembly operably coupled to the engine to perform a working function responsive at least in part to operation of the engine, and a key-operated combination ignition and speed control assembly including switch circuitry configured to control both starting the engine and selection of different selectable positions corresponding to respective different operating speeds for the engine.

In another example embodiment, a combination ignition and speed control assembly for outdoor power equipment having an engine is provided. The assembly may include a key, a key switch portion configured to receive the key in a key slot, and switch circuitry. The key switch portion may be rotatable to different selectable positions only when the key is inserted into the key slot. The switch circuitry may be configured to control both starting the engine and selection of the different selectable positions corresponding to respective different operating speeds for the engine.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
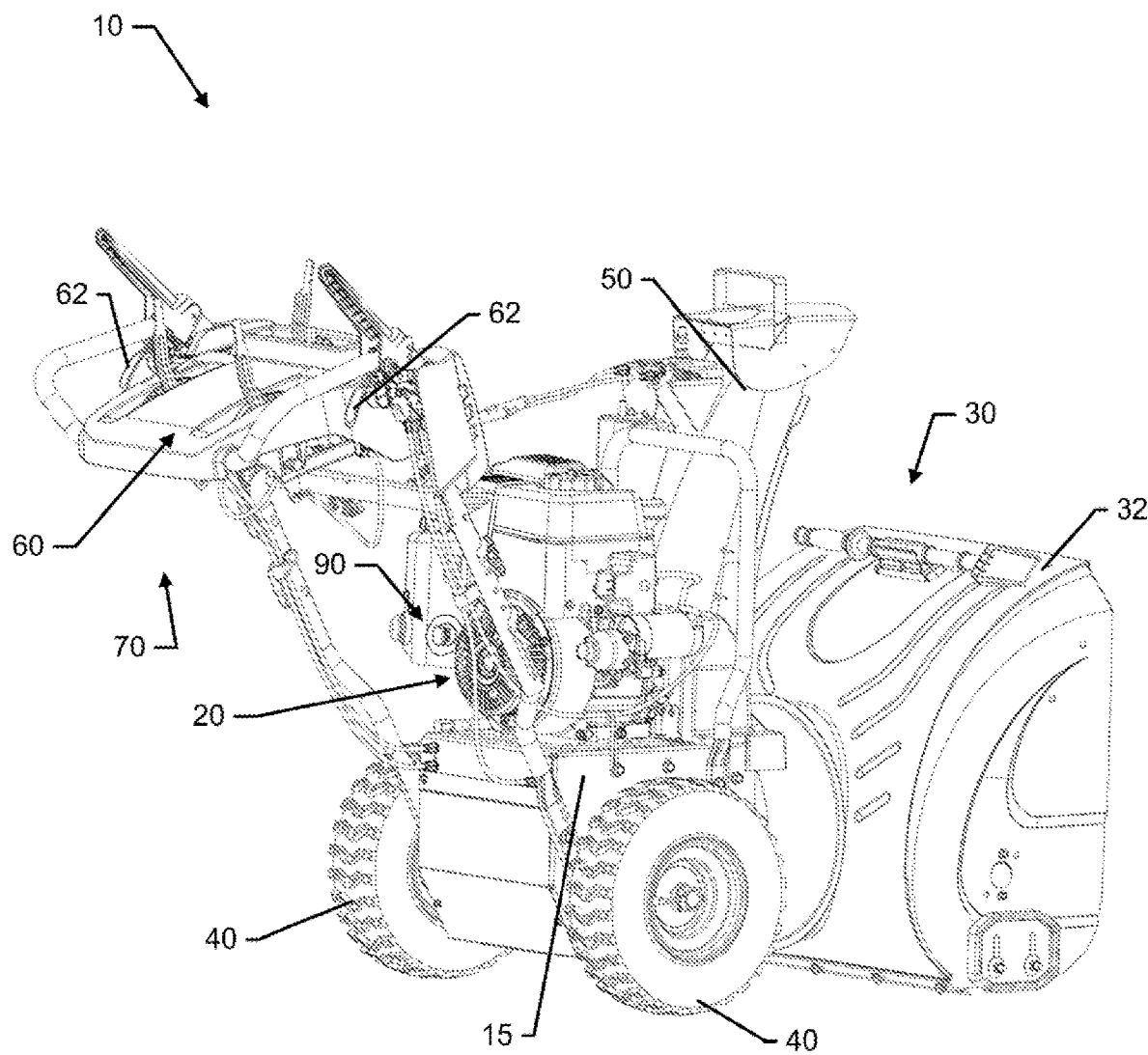
FIG. 1 illustrates a perspective view of a snow removal device according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

For a snow blower, or numerous other types of outdoor power equipment, it is common for the starter control and the speed control to be handled with separate components and/or circuitry. This, of course, causes additional cost and complexity. Example embodiments provide a key operated starter control assembly that also incorporates speed control into one universal key-operated system (e.g., ignition and speed control switch). FIG. 1 illustrates an example of a walk behind, powered device in the form of a snow removal device 10. Although the snow removal device 10 of FIG. 1 is shown as a walk-behind snow removal device (i.e., a snow blower or snow thrower), it should be appreciated that example embodiments could be employed in connection with other walk behind power equipment as well, such as tillers, mowers, edgers, and/or the like. Moreover, example embodiments may also be employed in connection with riding yard maintenance equipment as well (e.g., lawn tractors, zero turn mowers, and other riding lawn mowers or types of riding outdoor power equipment).

In some embodiments, the snow removal device 10 may include a chassis 15 or frame to which various components of the snow removal device 10 may be attached. For example, the chassis 15 may support an engine 20, such as a gasoline powered engine, and a working assembly 30. Operation of the engine 20 may be initiated by a recoil starter via pulling of a recoil starter handle by the operator. However, in other embodiments, the engine 20 may alternatively be started via a key, switch or other similar device.

The snow removal device 10 may include wheels 40 or continuous tracks forming a mobility assembly on which a substantial portion of the weight of the snow removal device 10 may rest, when the snow removal device 10 is stationary. The mobility assembly (e.g., the wheels 40 or continuous tracks) may also provide for mobility of the snow removal device 10. In some cases, the mobility assembly may be driven via power from the engine 20. However, in other cases, the mobility assembly may simply provide for mobility of the snow removal device 10 responsive to pushing by the operator. In other words, for example, the mobility assembly may be an active or passive provider of mobility for the snow removal device 10. As such, the mobility assembly may selectively provide forward or reverse power to each of the wheels 40.

In this example, the working assembly 30 is a dual stage snow thrower. As such, the working assembly 30 includes a rotatable auger (or auger blade) that is configured to work (e.g., spin, rotate, turn, and/or the like) in order to direct snow toward an impeller (or impeller blade) that also works (e.g., spins, rotates, turns, and/or the like) to direct snow toward a discharge path to be ejected from the snow removal device 10. However, it should be appreciated that the working assembly 30 of some embodiments could include a power brush or other implement used to move snow toward a second stage device (e.g., the impeller) for ejection from the working assembly 30. The working assembly 30 could also include a single stage auger or impeller or structures for performing another work function (e.g., a blade for mowing or edging, or a tine assembly for tilling). In an example embodiment, the working assembly 30 may be powered via operable coupling to the engine 20. The operable coupling of the working assembly 30 to the engine 20 may be selectively engaged and/or disengaged (e.g., via a clutch, one or more selectively engageable chains/belts/pulleys, a friction wheel or other similar devices). Components of the working assembly 30 (e.g., the auger and the impeller) may be housed in a bucket assembly 32.

As can be appreciated from FIG. 1, the bucket assembly 32 prevents escape of snow and directs the snow into the ejection path. Thus, the bucket assembly 32 also protects the operator from blowback and allows for a somewhat orderly disposal of the snow that is ejected by the snow removal device 10. The ejection path of the snow removal device 10 may be formed at least in part by the bucket assembly 32 and a discharge chute 50. As such, for example, the ejection path may begin proximate to an input of the impeller, at which point snow is imparted with momentum at an output of the impeller to be pushed toward, and ultimately through, the discharge chute 50.

In an example embodiment, the snow removal device 10 may further include a control panel 60, which may include ignition controls, operating levers (e.g., operating triggers 62) and/or other controls or informational gauges. The control panel 60 may be provided to be accessible from the rear of the snow removal device 10 by an operator standing or walking behind the snow removal device 10 (e.g., at an operating station) and capable of pushing, steering or otherwise controlling movement of the snow removal device 10 using a handlebar assembly 70 or some other steering assembly. In some examples, various ones of the operating triggers 62 may be employed to control various components of the mobility assembly and/or the working assembly 30. As such, for example, different ones of the operating triggers 62 may be operably coupled to various components to enable remote operator control of the respective components. In an example embodiment, operation of the operating triggers 62 may selectively engage or disengage drive power to the wheel on the same side as the corresponding operating trigger 62. Moreover, in some cases, operation of the operating triggers 62 may initiate braking.

The operation of the auger and/or impeller, application of drive power to the wheels 40 and the implementation of a mechanical power reversing assembly as described below are just a few examples of some of components that can be controlled by an operator at the control panel 60. In some cases, the control panel 60 may include an auger control lever 61 to engage auger motion to cause snow throwing. In an example embodiment, the control panel 60 may also include controls for starting the engine 20 and/or controlling the speed of the engine 20. However, such controls need not necessarily be located at the control panel 60. In this regard, in some cases, controls for ignition and speed may be located locally at the engine 20 or at another location on the snow removal device 10.

In an example embodiment, a universal or combination ignition and speed control assembly 90 may be employed by the snow removal device 10. In the example of FIG. 1, the combination ignition and speed control assembly 90 may be located proximate to the engine 20. However, as noted above, the combination ignition and speed control assembly 90 could alternatively be located at any other suitable location. The combination ignition and speed control assembly 90 may be configured to provide control for both ignition functions and speed control functions from a single key-operated component.

Figure 2:
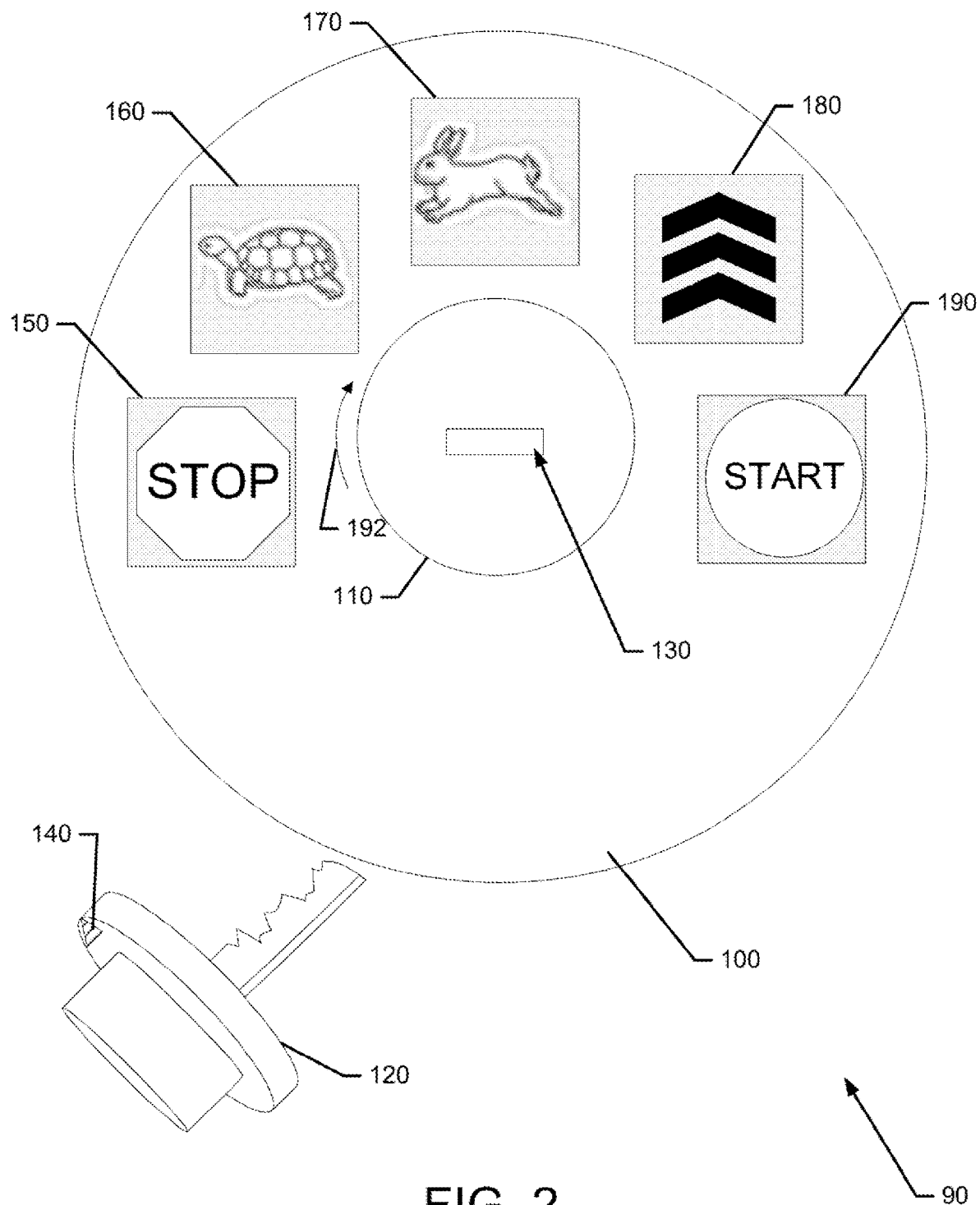
FIG. 2 illustrates a plan view of a key-operated combination ignition and speed control assembly according to an example embodiment.

FIG. 2 illustrates an example implementation of the combination ignition and speed control assembly 90 in accordance with one embodiment. As shown in FIG. 2, the combination ignition and speed control assembly 90 may include a position indicator 100 on which various icons or indicators of selectable positions may be displayed or presented. The icons or indicators may be fixed placards made of any suitable material or, in some cases, may be lighted or colored display elements. In still other cases, an electronic display may be used to render icons at the position indicator 100. In some embodiments, the position indicator 100 may be front panel of the combination ignition and speed control assembly 90 behind which a switch body comprising the physical switch connections that are implemented by the combination ignition and speed control assembly 90 may be provided.

A key switch portion 110 may be provided to enable selection of individual ones of the selectable positions shown on the position indicator 100. In this regard, a key 120 may be inserted into a key slot 130 of the key switch portion 110 in order to enable the key switch portion 110 to be rotated. As such, the key switch portion 110 may not be rotatable when the key 120 is not inserted into the key slot 130. A pointer 140 on the key 120 may identify the current position among the selectable positions.

Although FIG. 2 is merely one example, the selectable positions may include a stop position 150, a slow speed position 160, and a high (or medium) speed position 170. Although not required, other speed settings, or a variable selection between limits, may also be possible. For example, a boost position 180 or maximum speed selection may also be included in some cases. Regardless of the number of selectable speed positions, a start position 190 may also be provided on the position indicator 100. By inserting the key 120 into the key slot 130, the key switch portion 110 may be rotatable between any of the selectable positions shown (or other positions in other examples).

In some example embodiments, the key switch portion 110 may be constructed so that the key 120 can only be inserted into and removed from the key slot 130 when the key switch portion 110 is rotated such that the pointer 140 aligns with the stop position 150. As such, if the key switch portion 110 is rotated to any other position, the key 120 cannot be removed from the key slot 130. Thus, the stop position 150 is the normal position for the key switch portion 110 when the key 120 is not inserted into the key slot 130, as shown in FIG. 2.

Upon inserting the key 120 into the key slot 130, the key switch portion 110 may be activated to make switch connections described in greater detail below. Likewise, after key 120 insertion into the key slot 130, the user may be enabled to rotate the key 120 as shown by arrow 192 in order to select any of the corresponding selectable positions shown in FIG. 2. As the key switch portion 110 correspondingly rotates with the key 120, respective physical switch connections corresponding to each of the selectable positions will be made as discussed in greater detail below. However, it should also be appreciated that instead of corresponding to discrete positions, the slow speed position 160, the high speed position 170 and the boost position 180 could each be indicators of relative speed along a variable speed selector. In such a case, speed may be variable from a lowest setting (proximate to the slow speed position 160) to a highest speed setting (proximate to the boost position 180).

Figure 3:
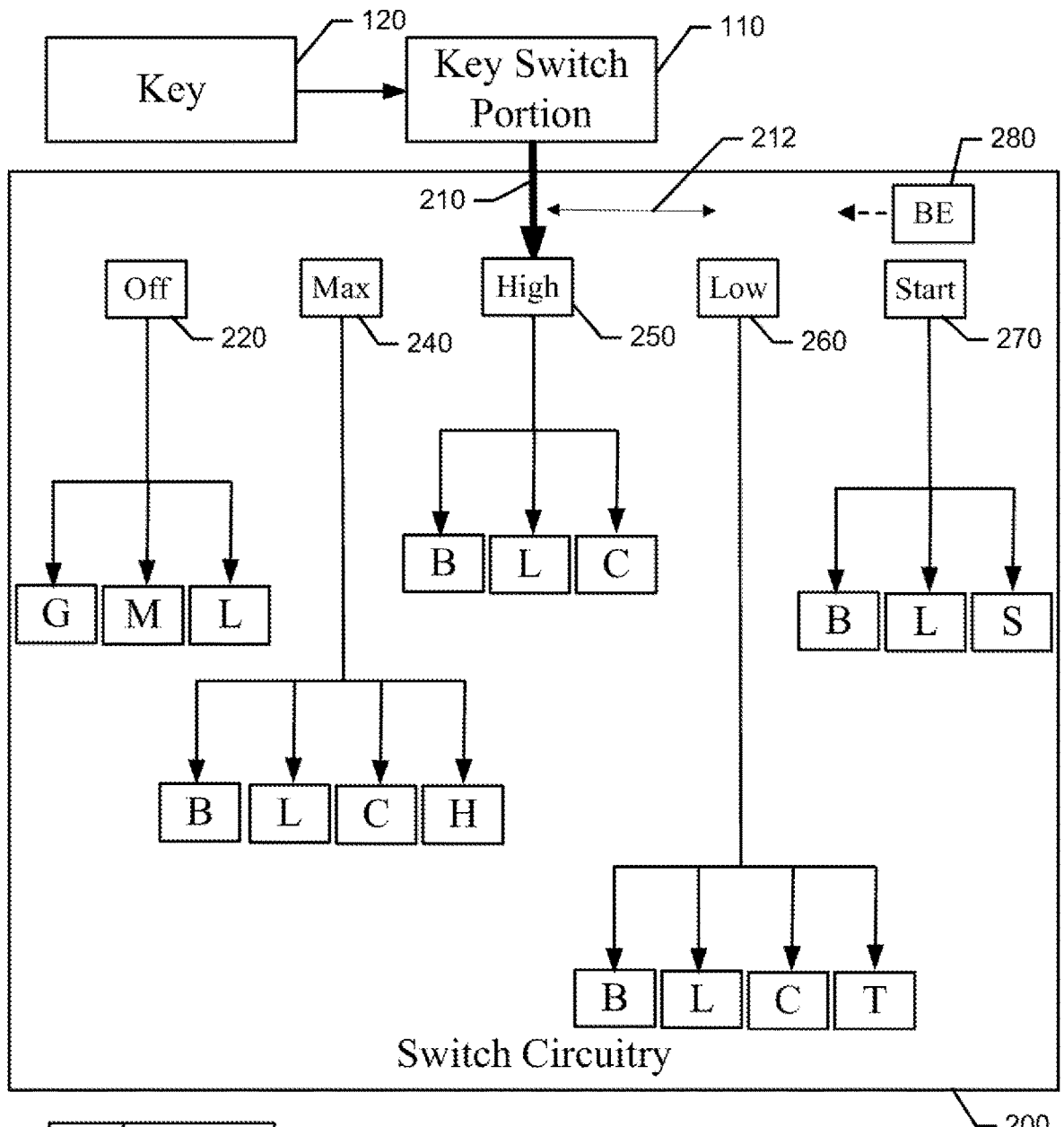
FIG. 3 illustrates a schematic diagram showing switch circuitry according to an example embodiment.

FIG. 3 illustrates an example schematic diagram of switch circuitry 200 (e.g., the switch connections made for corresponding ones of the selectable positions of the key switch portion 110) in accordance with an example embodiment. As shown in FIG. 3, the key 120 may be used to physically rotate the key switch portion 110 as described above. Rotation of the key switch portion 110 may correspondingly select respective different terminal locations inside the switch circuitry 200. The terminal locations may correspond to the selectable positions shown in FIG. 2. Thus, for example, when the key switch portion 110 is physically rotated, a terminal selector 210 may be moved to a corresponding one of the terminal locations shown in FIG. 3 by moving in the directions shown by double arrow 212.

Movement of the terminal selector 210 (e.g., by rotating the key switch portion 110) to an off terminal 220 may correspond to the stop position 150 shown in FIG. 2. Meanwhile, as shown in table 230, the rotation of the key switch portion 110 to the off terminal 220 may engage circuitry that connects ground (G) to the magneto (M) in order to shut the engine 20 down. Ground (G) may also be connected to the lights (L) to turn the lights off. As such, movement of the key switch portion 110 to the off terminal 220 may shut down the snow removal device 10 (or other outdoor power equipment).

Movement of the terminal selector 210 to a max speed terminal 240 may correspond to the boost position 180 of FIG. 2. As shown in table 230, rotation of the key switch portion 110 to the max speed terminal 240 may engage circuitry that connects the battery (B) to the lights (L) to turn on the lights of the snow removal device 10 (or keep them on). Other speed control circuitry may also be engaged. For example, a common speed circuit (C) and a high speed circuit (H) may each be engaged in order to achieve the maximum or boost speed (for drive power and/or for speed of turning the auger or other working assembly) for the snow removal device 10. Although specific speed settings may vary in different applications, the max speed terminal 260 of some embodiments may provide about 3600 RPM.

Movement of the terminal selector 210 to a high or normal speed terminal (e.g., high speed terminal 250) may correspond to the high (or medium) speed position 170 of FIG. 2. As shown in table 230, rotation of the key switch portion 110 to the high speed terminal 250 may engage circuitry that connects the battery (B) to the lights (L) to turn on the lights of the snow removal device 10 (or keep them on). Other speed control circuitry may also be engaged. For example, the common speed circuit (C) may be engaged in order to achieve the high or medium speed (for drive power and/or for speed of turning the auger or other working assembly) for the snow removal device 10. Although specific speed settings may vary in different applications, the high speed terminal 240 of some embodiments may provide about 3200 RPM.

Movement of the terminal selector 210 to a low speed terminal 260 may correspond to the low position 160 of FIG. 2. As shown in table 230, rotation of the key switch portion 110 to the low speed terminal 260 may engage circuitry that connects the battery (B) to the lights (L) to turn on the lights of the snow removal device 10 (or keep them on). Other speed control circuitry may also be engaged. For example, the common speed circuit (C) and a low speed circuit (T) may be engaged in order to achieve the low speed (for drive power and/or for speed of turning the auger or other working assembly) for the snow removal device 10. Although specific speed settings may vary in different applications, the low speed terminal 260 of some embodiments may provide about 2000 RPM.

Movement of the terminal selector 210 to a start terminal 270 may correspond to the start position 190 of FIG. 2. As shown in table 230, rotation of the key switch portion 110 to the start terminal 270 may engage circuitry that connects the battery (B) to the lights (L) to turn on the lights of the snow removal device 10 (or keep them on). The starter circuit (S) may also be engaged in order to start the engine 20 of the snow removal device 10. In some example embodiments, none of the selectable positions associated with speed selections may be activated (or effectively activated) until the engine 20 is running. Thus, for example, going from the off terminal 220 to the max speed terminal 240 may turn on the lights by connecting the battery (B) to the lights (L). However, although the circuitry for connecting the common speed circuit (C) and the high speed circuit (H) may each be engaged, there may be no effect since the engine 20 is not running. Only when the engine 20 is running (i.e., subsequent to selecting the start terminal 270) may any impact be noticed for engagement of the terminals (C), (H) and (T). In a circuit employing variable speeds instead of discrete speeds, the switching circuitry may employ a variable potentiometer or other variable selector to determine speed.

In some example embodiments, any of the terminals may be selected as a final or rest position for the key 120 and the key switch portion 110 except for the start terminal 270. Thus, for example, a biasing element (BE) 280 may be provided to urge the terminal selector 210 out of the start terminal 270 position. The operator may therefore be required to hold the key 120 and the key switch portion 110 against the biasing force exerted by the BE 280 until the engine 20 is started. The BE 280 may be configured to, once the operator stops applying force to overcome the BE 280, move the terminal selector 210 to the adjacent position. In the example of FIG. 3, the BE 280 may move the terminal selector 210 to the low speed terminal 260. Notably, this is not the same ordering that is shown in the example of FIG. 2. The example of FIG. 2 places the boost position 180 (and therefore the max speed terminal 240) adjacent to the start position 190 (and therefore the start terminal 270). However, the ordering of the selectable positions (shown in FIGS. 2 and 3) may be made in any desired way based on an effort to put the default speed to which the engine 20 is returned by the BE 280 adjacent to the start position 290 and start terminal 270. Thus, FIGS. 2 and 3 should be understood to show two different paradigms for arranging the positions and terminals.

The arrangement paradigm should be understood to determine the default speed to which the engine 20 is set after starting of the engine. Thus, for example, the combination ignition and speed control assembly itself can be set up to start the engine 20 immediately at a low RPM to prevent high RPM on a cold start. However, other priorities or strategies could also be implemented in this way. Example embodiments may therefore provide a rotatable switch assembly (e.g., a tumbler) that is key-actuated but controls both ignition and speed selection for the engine 20. This removes the need for two separate controller and thereby reduces cost and complexity of the powered device.

Thus, a powered device in accordance with an example embodiment may be provided. The powered device may include an engine, a mobility assembly operably coupled to the engine to provide mobility of the powered device responsive at least in part to operation of the engine, a working assembly operably coupled to the engine to perform a working function responsive at least in part to operation of the engine, and a key-operated combination ignition and speed control assembly including switch circuitry configured to control both starting the engine and selection of different selectable positions corresponding to respective different operating speeds for the engine.

The powered device (or combination ignition and speed control assembly) of some embodiments may include additional features that may be optionally added either alone or in combination with each other. For example, in some embodiments, the combination ignition and speed control assembly may include a key switch portion that is rotatable to the different selectable positions. The key switch portion may be rotatable only when the key is inserted into a key slot of the key switch portion. In an example embodiment, the key is only insertable into the key slot and removable from the key slot in a stop position in which the engine is off. In an example embodiment, the engine may be started responsive to rotating the key switch portion to a start position, and the key switch portion may include a biasing element configured to urge the key switch portion out of the start position to a default speed. In some cases, the default speed may be a lowest speed setting of the engine or a highest speed setting of the engine. In an example embodiment, the different selectable positions may include a high speed position having a corresponding high speed terminal engaging circuitry for generating a high engine RPM setting and a low speed position having a corresponding low speed terminal engaging circuitry for generating a low engine RPM setting. In some cases, the different selectable positions may include a boost speed position having a corresponding maximum speed terminal engaging circuitry for generating additional RPM beyond the high engine RPM setting. In an example embodiment, the key-operated combination ignition and speed control assembly may include a position indicator including respective icons or indicators corresponding to each of the different selectable positions. In some cases, the respective icons or indicators may be fixed placards, or lighted or colored display elements. In an example embodiment, the different selectable positions may include a plurality of variable selections (e.g., infinitely adjustable, non-finite locations) between a highest and lowest speed setting. The powered device may be embodied as a snow removal device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A powered device comprising:
   an engine;
   a mobility assembly configured to provide mobility of the powered device;
   a working assembly operably coupled to the engine to perform a working function responsive at least in part to operation of the engine; and
   a key-operated combination ignition and speed control assembly comprising switch circuitry configured to control both starting the engine and selection of different selectable positions corresponding to respective different non-zero forward operating speeds for the engine.

2. The powered device of claim 1, wherein the combination ignition and speed control assembly comprises a key switch portion that is rotatable to the different selectable positions,
   wherein the key switch portion is rotatable only when the key is inserted into a key slot of the key switch portion.

3. The powered device of claim 2, wherein the key is only insertable into the key slot and removable from the key slot in a stop position in which the engine is off.

4. The powered device of claim 2, wherein the engine is started responsive to rotating the key switch portion to a start position, and
   wherein the key switch portion includes a biasing element configured to urge the key switch portion out of the start position to a default speed.

5. The powered device of claim 4, wherein the default speed is a lowest speed setting of the engine.

6. The powered device of claim 4, wherein the default speed is a highest speed setting of the engine.

7. The powered device of claim 2, wherein the different selectable positions include a high speed position having a corresponding high speed terminal engaging circuitry for generating a high engine revolutions per minute (RPM) setting and a low speed position having a corresponding low speed terminal engaging circuitry for generating a low engine RPM setting.

8. The powered device of claim 7, wherein the different selectable positions include a boost speed position having a corresponding maximum speed terminal engaging circuitry for generating additional RPM beyond the high engine RPM setting.

9. The powered device of claim 1, wherein the different selectable positions include a plurality of variable selections between a highest and lowest speed setting.

10. The powered device of claim 1, wherein the key-operated combination ignition and speed control assembly comprises a position indicator including respective icons or indicators corresponding to each of the different selectable positions.

11. The powered device of claim 10, wherein the respective icons or indicators are fixed placards, or lighted or colored display elements.

12. A combination ignition and speed control assembly for outdoor power equipment having an engine, the combination ignition and speed control assembly comprising:
   a key;
   a key switch portion configured to receive the key in a key slot, the key switch portion being rotatable to different selectable positions only when the key is inserted into the key slot; and
   switch circuitry configured to control both starting the engine and selection of the different selectable positions corresponding to respective different non-zero forward operating speeds for the engine.

13. The assembly of claim 12, wherein the key is only insertable into the key slot and removable from the key slot in a stop position in which the engine is off.

14. The assembly of claim 12, wherein the engine is started responsive to rotating the key switch portion to a start position, and
   wherein the key switch portion includes a biasing element configured to urge the key switch portion out of the start position to a default speed.

15. The assembly of claim 14, wherein the default speed is a lowest speed setting of the engine.

16. The assembly of claim 14, wherein the default speed is a highest speed setting of the engine.

17. The assembly of claim 12, wherein the different selectable positions include a high speed position having a corresponding high speed terminal engaging circuitry for generating a high engine revolutions per minute (RPM) setting and a low speed position having a corresponding low speed terminal engaging circuitry for generating a low engine RPM setting.

18. The assembly of claim 17, wherein the different selectable positions include a boost speed position having a corresponding maximum speed terminal engaging circuitry for generating additional RPM beyond the high engine RPM setting.

19. The assembly of claim 12, further comprising a position indicator including respective icons or indicators corresponding to each of the different selectable positions.

20. The assembly of claim 19, wherein the respective icons or indicators are fixed placards, or lighted or colored display elements.

* * * * *